United States Patent
Nihei et al.

(10) Patent No.: US 8,386,138 B2
(45) Date of Patent: Feb. 26, 2013

(54) FASTENING PRESSURE CONTROL DEVICE FOR STARTING FRICTION ELEMENT AT TIME OF CONTROLLING IDLE STOP OF VEHICLE

(75) Inventors: Hironori Nihei, Isehara (JP); Masato Koga, Hiratsuka (JP); Takashi Matsuda, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 282 days.

(21) Appl. No.: 12/994,349

(22) PCT Filed: May 21, 2009

(86) PCT No.: PCT/JP2009/059309
§ 371 (c)(1),
(2), (4) Date: Nov. 23, 2010

(87) PCT Pub. No.: WO2009/147950
PCT Pub. Date: Dec. 10, 2009

(65) Prior Publication Data
US 2011/0071740 A1 Mar. 24, 2011

(30) Foreign Application Priority Data
Jun. 4, 2008 (JP) .................................. 2008-146387

(51) Int. Cl.
*G06F 7/00* (2006.01)
*G05D 1/00* (2006.01)
*G06G 7/00* (2006.01)
(52) U.S. Cl. .................. 701/54; 701/21; 701/51; 701/70
(58) Field of Classification Search .................... 701/22, 701/51, 54, 70; 180/65.1, 65.2, 65.3, 65.4, 180/65.5, 65.6; 477/3, 8, 11, 90, 107, 156, 158
See application file for complete search history.

(56) References Cited

U.S. PATENT DOCUMENTS

| | | | | |
|---|---|---|---|---|
| 4,665,777 A | * | 5/1987 | Kikuchi et al. | 477/93 |
| 6,459,980 B1 | * | 10/2002 | Tabata et al. | 701/70 |
| 6,647,326 B2 | * | 11/2003 | Nakamori et al. | 701/22 |
| 7,089,095 B2 | * | 8/2006 | Takami et al. | 701/22 |
| 2002/0166532 A1 | * | 11/2002 | Mori et al. | 123/179.31 |
| 2003/0045988 A1 | * | 3/2003 | Suzuki et al. | 701/54 |
| 2004/0152558 A1 | * | 8/2004 | Takami et al. | 477/3 |
| 2007/0066442 A1 | * | 3/2007 | Ido | 477/107 |
| 2008/0125284 A1 | * | 5/2008 | Tanaka et al. | 477/39 |

FOREIGN PATENT DOCUMENTS

| | | |
|---|---|---|
| JP | 2001-41067 A | 2/2001 |
| JP | 3807145 B2 | 5/2006 |
| JP | 2006-170399 A | 6/2006 |

* cited by examiner

Primary Examiner — Ian Jen
(74) Attorney, Agent, or Firm — Foley & Lardner LLP

(57) ABSTRACT

An engine is restarted in response to an idle stop OFF command at t1 so that a gear shift control purpose hydraulic pressure is raised according to a working oil from an engine driven oil pump. An idle stop release time control of the engine is allowed according to a torque down unnecessary determination when a gear shift control purpose hydraulic pressure has reached to a set hydraulic pressure at t2. In a case where this allowance causes an engine torque Te to be raised from a torque down value toward a driving operation corresponding value by a predetermined gradient $\Delta Te1$, a command value of a starting frictional element engagement pressure $P_s$ is set to a control maximum value during the idle stop control including during the idle stop release time control.

7 Claims, 10 Drawing Sheets

FASTENING PRESSURE CONTROL DEVICE FOR STARTING FRICTION ELEMENT AT TIME OF CONTROLLING IDLE STOP OF VEHICLE

TECHNICAL FIELD

The present invention relates to a vehicle in which a transmission configured to transmit a power of an engine to drive wheels under a gear shift via a starting frictional element and to perform the gear shift by means of a hydraulic pressure from an engine driven oil pump during a driving of the engine is equipped. Especially, the present invention relates to an apparatus to execute an engagement pressure control for the starting frictional element during an operation of an idle stop control apparatus in a form enabling a small sizing of an electrically-powered oil pump. The idle stop control apparatus performs, during a determination of a vehicle stop, an idle stop which automatically stops the engine and making the starting frictional element a state immediately before an engagement start according to a working oil from an electrically-powered oil pump when a predetermined condition is established and, when the predetermined condition becomes un-established, performs an idle stop release time control in which the engine is restarted in response to a release of the idle stop and the engine is made in a state responding to a driving operation when a hydraulic pressure for a gear shift control becomes sufficiently high.

BACKGROUND ART

One of techniques to improve a fuel economy of a vehicle includes an idle stop control technique which automatically stops an engine when a predetermined condition such that a stopped state with no intention to start the vehicle is elapsed by a set time during a vehicle stopped state is established.

This idle stop control technique also serves to restart the engine automatically in response to a release of the idle stop, when such an operation of a vehicle driver that a brake pedal is released so that a brake is transferred from an operation state to a non-operation state is preformed in order for the vehicle driver intentionally to make the start of the vehicle.

On the other hand, a transmission is gear shift controlled according to a hydraulic pressure from an engine driven oil pump driven by the engine.

Incidentally, since, during the idle stop, the engine is not driven, the hydraulic pressure from the engine driven oil pump is not present, and a starting frictional element of the transmission is in a release state, the transmission is in a power transmission disabled state.

When, in these states, the engine is restarted in response to the release of the idle stop, the hydraulic pressure from the engine driven oil pump driven by the engine is generated so that the transmission is in a power transmission enabled state.

However, a response delay occurs from a time of the generation of the hydraulic pressure due to the restart of the engine to a time of the power transmission enabled state according to an engagement of the starting frictional element.

When an idle stop release time control which makes the engine a state responding to the driving operation is performed during the above-described response delay, a rising engine output according to this idle stop release time control is inputted to the transmission (in the power transmission disabled state) before the power transmission enabled state, such a problem occurs that an ill influence is given on a durability of the transmission.

A technique has, heretofore, been proposed in which the starting frictional element of the transmission is stroke operated into a state immediately before the start of the engagement (a state immediately before an engagement capacity is started to have in the starting frictional element) according to a working oil from the electrically-powered oil pump in place of the engine driven oil pump during the idle stop and, thus, the transmission is held in the state immediately before the power transmission start, as described, for example, in a patent document 1.

According to this technique, during the idle stop, in order to hold the transmission in the state immediately before the power transmission start by stroking operation the starting frictional element into the state immediately before the engagement start according to the working oil from the electrically-driven oil pump, the working oil from the engine driven oil pump can speedily be started to engage the starting frictional element when the engine is restarted in response to the release of the idle stop. Thus, at the time of restart of the engine, the transmission can speedily fall into the power transmission enabled state. Hence, a rising engine torque according to the restart is not inputted to the transmission (in the state in which the power transmission is disabled) before the power transmission enabled state so that the problem such that the ill influence is given on the durability of the transmission can be eliminated.

Pre-Published Document
Patent Document

Patent document 1: Japanese Patent Application First Publication (tokkai) No. 2001-041067 official Gazette (FIG. 3 column 6)

SUMMARY OF THE INVENTION

Problem to be Solved by the Invention

However, it is an usual practice that a starting frictional element engagement pressure control section produces a starting frictional element engagement pressure corresponding to an engagement pressure command value with the working oil (pump discharge pressure) partially drained in a case where the working oil from the electrically-powered oil pump is a medium, in the same way as the working oil from the engine driven oil pump is the medium, when the engagement control for the starting frictional element is performed.

On the other hand, the electrically-powered oil pump is installed to hold the transmission in the state immediately before the power transmission is started by stroke operating the starting frictional element into the state immediately before the engagement start, as described above. Hence, the above-described engagement pressure command value is set to a starting frictional element engagement start immediate before state achieving hydraulic pressure value which meets this requirement.

Incidentally, the electrically-powered oil pump needs to drain the working oil by a quantity corresponding to the drain carried out as described above when the engagement pressure control of the starting frictional element is performed in addition to a working oil quantity necessary to generate a starting frictional element engagement start immediate before achieving hydraulic pressure to operate the starting frictional element in the starting frictional element engagement start immediate before state, in order to produce the starting frictional element engagement pressure for achieving the starting frictional element engagement start immediate state achieving purpose with the working oil (pump discharge pressure) partially drained in accordance with the engagement pressure command value set to the starting frictional element engagement start immediate before state achieving hydraulic pressure. Thus, a required capacity of the electrically-powered oil pump is accordingly increased.

On the other hand, it is necessary for the electrically-powered oil pump to be a small-sized electrically-powered oil pump having a pump capacity as small as possible in view of constraints of an installation space and of a cost.

It is necessary for electrically-powered oil pump to extra drain the working oil by the quantity corresponding to the drain described above when the engagement pressure control of the starting frictional element as described above is performed. However, this necessity makes the required capacity of the electrically-powered oil pump increase so that a large sizing of the electrically-powered oil pump is introduced. This cannot satisfy the requirement of the small-sized electrically-powered oil pump having the pump capacity as small as possible in view of the constraints of the installation space and of the cost.

A gist of the present invention is that a drain port opening angle of a clutch hydraulic pressure control valve for the engagement pressure command value is made small as compared with that in a case of an ordinary control, the engagement command value of the starting frictional element not being set to the above-described starting frictional element engagement start immediate before state achieving hydraulic pressure value.

In more details, if the engagement pressure command value is set to a control maximum value, the above-described drain is not needed so that the electrically-powered oil pump can be a small-sized electrically-powered oil pump having a small capacity. It is, from this viewpoint, an object of the present invention to provide an engagement pressure control apparatus for a starting engagement element at a time of an idle stop control of a vehicle which embodies this concept and which can eliminate the problem described above.

Means for Solving the Problem

To achieve the above-described object, the engagement pressure control apparatus for a starting frictional element according to the present invention is structured as described in the claim 1.

First, a vehicle which is a prerequisite of the present invention will be described below. That is to say, the vehicle is equipped with an engine; drive wheels; a transmission configured to transmit a power of the engine to the drive wheels via the starting frictional element under a gear shift; a gear shift control section configured to perform a gear shift control for the transmission by means of a hydraulic pressure from an engine driven oil pump driven by the engine, during a driving of the engine; and an idle stop control section configured to, when a predetermined condition is established, perform an idle stop such that the engine is automatically stopped and make the starting frictional element an engagement start immediate before state according to the engagement pressure produced by a partial draining of a working oil from an electrically-powered oil pump by means of a starting frictional element engagement pressure control section and to, when the predetermined condition becomes un-established, restart the engine in response to a release of the idle stop and make the engine a driving operation responding state, at a time of a vehicle stop determination.

The present invention has a feature that, during an operation of the idle stop control section, an engagement pressure command value issued to the starting frictional element engagement pressure control section is set to a control maximum value (namely, a drain port opening angle of a clutch hydraulic pressure control valve for an engagement pressure command value issued to the starting frictional element engagement pressure control section is made small as compared with the drain port opening angle of an ordinary control in accordance with an input torque of the starting frictional element).

Effect of the Invention

According to the engagement pressure control apparatus for the starting frictional element at the time of the idle stop control according to the present invention, the engagement pressure command value issued to the starting frictional element engagement pressure control section is set to the control maximum value, during the operation of the idle stop control apparatus. Therefore, the starting frictional element engagement pressure control section does not drain the working oil from the electrically-powered oil pump when the engagement pressure control of the starting frictional element is performed. Hence, the electrically-powered oil pump becomes unnecessary to discharge the working oil including the draining quantity.

Then, electrically-powered oil pump can be small-sized electrically-powered oil pump having the small capacity. Thus, the electrically-powered oil pump can be cope with the constraint of the installation space and the cost.

DETAILED DESCRIPTION OF THE PREFERRED EMBODIMENT

Hereinafter, a preferred embodiment according to the present invention will be described in details on a basis of the accompanied drawings.

Figure 1:
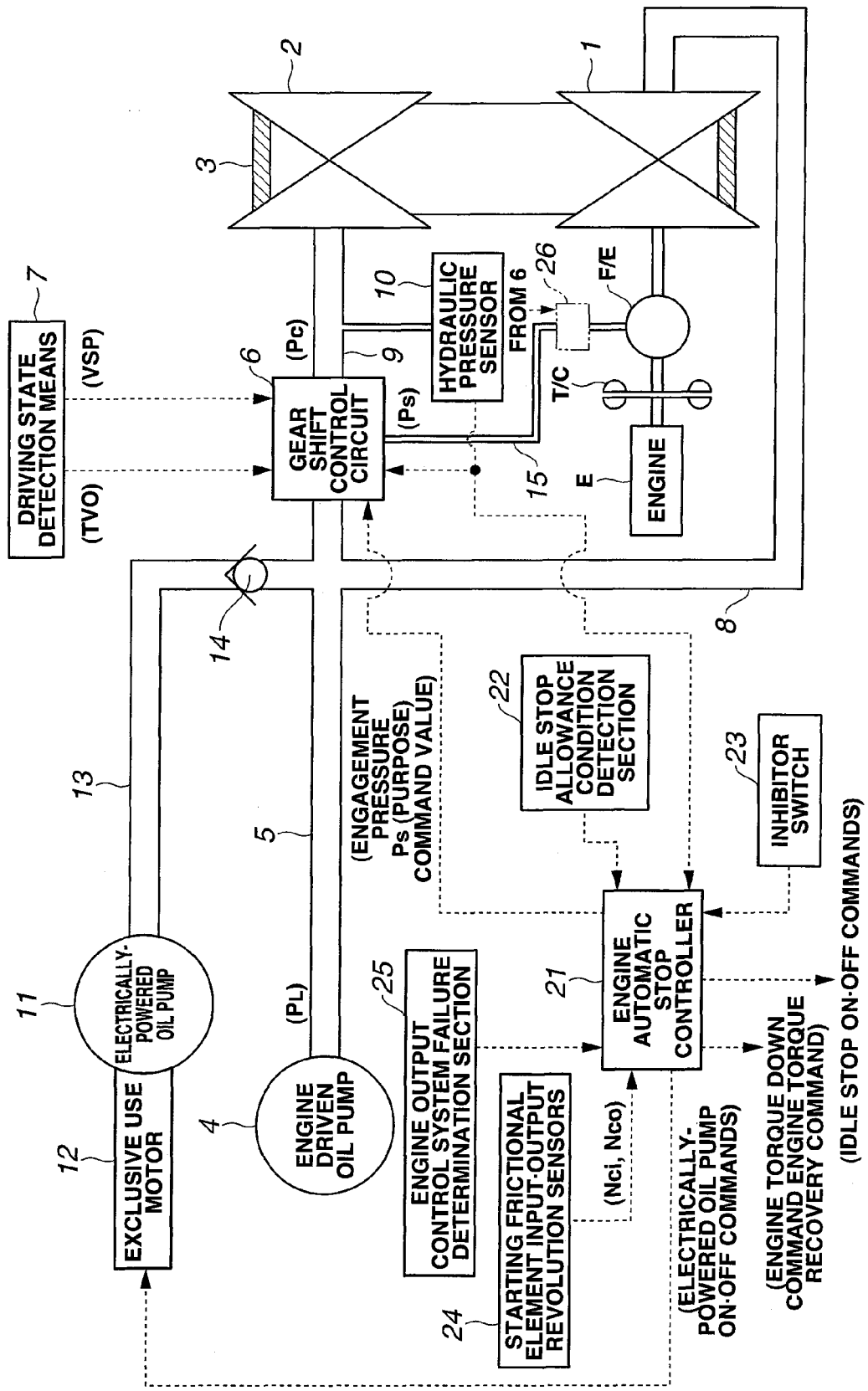
FIG. 1 shows a system configuration view representing a preferred embodiment of an engagement pressure control apparatus for a starting frictional element at a time of an idle stop control structured for a vehicle in which a V-belt continuously variable transmission is mounted.

FIG. 1 shows a preferred embodiment of an engagement pressure control apparatus for a starting frictional element at a time of an idle stop control of a vehicle having an idle stop control apparatus and in which a V-belt continuously variable transmission is equipped.

A reference numeral 1 denotes a primary pulley of the V-belt continuously variable transmission, a reference numeral 2 denotes a secondary pulley of the V-belt continuously variable transmission, these primary pulley 1 and secondary pulley 2 being aligned mutually within approximately the same axial right angle surface. A V-belt 3 is bridged between primary pulley 1 and secondary pulley 2 to constitute a transmission section of the V-belt continuously variable transmission.

An engine E is coupled to primary pulley 1 via a starting frictional element F/E such as a forward clutch or a reverse brake within a forward-and-reverse switching mechanism (not shown) and a torque converter T/C to enable an input of a revolution of engine E into primary pulley 1 through torque converter T/C and starting frictional element F/E.

The revolution of primary pulley 1 is transmitted to secondary pulley 2 via V-belt 3 and the revolution of secondary pulley 2 is transmitted to drive wheels. This serves for a traveling of the vehicle.

In the above-described V-belt continuously variable transmission, during the transmission, one of two opposed V groove sheave surfaces (a left-side movable sheave surface as viewed from FIG. 1) approaches to or spaced apart from the other fixed sheave surface to make a V groove width small or large and, at the same time, the V groove sheave surface (movable sheave surface) at a right side in FIG. 1 of primary pulley 1 is spaced apart or approaches to the V groove sheave surface (fixed sheave surface) at the opposite side to make the V groove width large or small. Thus, a winding arc diameter of V-belt 3 with respect to primary pulley 1 and secondary pulley 2 is continuously varied to perform a gear shift unlimitedly.

A gear shift control of the V-belt continuously variable transmission is executed by adjusting a pressing hydraulic pressure on the movable sheave surface of secondary pulley 2. When this gear shift control is performed, a gear shift control circuit 6 (an electronic control section and a hydraulic pressure control section) performs the gear shift control in the following way with a working oil from an engine driven oil pump 4 driven by an engine coupled to primary pulley 1 supplied to a line pressure oil passage 5 as a medium.

It should be noted that engine driven oil pump 4 is a non-reversible pump such as a rotary vane pump (a pump in which, under its stopped state, the working oil within oil passage 5 is not caused to flow down to an oil pan).

Driving state detection means 7 detects an engine throttle opening angle TVO and vehicle speed VSP representing a driving state of the vehicle. Gear shift control circuit 6 regulates the hydraulic pressure of the working oil from oil pump 4 to oil passage 5 to line pressure $P_L$ corresponding to an input torque of the transmission through a regulator valve (not shown) on a basis of a driving information described above.

This line pressure $P_L$ corresponds to the hydraulic pressure for the gear shift control purpose according to the present invention.

This line pressure $P_L$ acts on the movable sheave surface of primary pulley 1 via a primary pulley oil passage 8 so that the movable sheave surface of primary pulley 1 is biased against the fixed sheave surface by a thrust force corresponding to the transmission input torque and V-belt 3 is pressed between these sheave surfaces by a force corresponding to the transmission input torque.

Gear shift control circuit 6, furthermore, determines a target input revolution speed (a target gear shift ratio) appropriate for a present driving state from a s scheduled shift map on a basis of engine throttle opening angle TVO and vehicle speed VSP detected by the driving state detection means 7.

Gear shift control circuit 6 performs a pressure reduction for line pressure $P_L$ within oil passage 5 as a source pressure, produces a gear shift control pressure $P_C$ to achieve the above-described target input revolution speed (target gear shift ratio), and supplies this gear shift control pressure $P_C$ from gear shift control pressure oil passage 9 to secondary is pulley 2 as a movable sheave surface pressing hydraulic pressure of secondary pulley 2.

Secondary pulley 2 presses V-belt 3 between both sheave surfaces with the movable sheave surface pressing force according to the above-described hydraulic pressure and a spring force by a secondary pulley built-in spring (not shown) biasing the movable sheave surface toward the fixed sheave surface to perform the gear shift control in order for the V-belt continuously variable transmission to make the input revolution speed (an input gear shift ratio) coincident with the target input revolution speed (the target gear shift ratio).

Hence, gear shift control pressure $P_C$ corresponds to the gear shift control purpose hydraulic pressure according to the present invention in the same way as line pressure $P_L$.

Incidentally, there is a possibility that gear shift control pressure $P_C$ is deviated from a hydraulic pressure value required for achieving the target input revolution speed (the target gear shift ratio) due to a receipt of such a disturbance as to disturb an accurate gear shift control. In order to avoid such a possibility as described above, the following feedback control system is added.

In other words, a hydraulic pressure sensor 10 is installed to detect the movable sheave surface pressing hydraulic pressure of secondary pulley 2 and the detected movable sheave surface pressing hydraulic pressure by the hydraulic pressure sensor 10 is fed-back to gear shift control circuit 6.

Gear shift control circuit 6 calculates to what degree the feedback movable sheave surface pressing hydraulic pressure of secondary pulley 2 is separated from a command value of gear shift control pressure $P_C$ required to achieve the target input revolution speed (the target gear is shift ratio), varies the command value of gear shift control pressure $P_C$ so as to eliminate this separation, and, thus, achieves the accurate gear shift control continuously without deviation of gear shift control pressure $P_C$ from the hydraulic pressure value required to achieve the target input revolution speed (the target gear shift ratio) even if the disturbance is received.

Gear shift control circuit 6, furthermore, produces a starting frictional element engagement pressure $P_S$ performing an engagement of starting frictional element F/E by a pressure reduction of line pressure $P_L$ through the partial draining and supplies starting frictional element engagement pressure $P_S$ to starting frictional element via starting frictional element engagement pressure oil passage 15.

Hence, gear shift control circuit 6 corresponds to a starting frictional element engagement pressure control section according to the present invention.

It should be noted that starting frictional element engagement pressure $P_S$ is controlled to a value for starting frictional element F/E to be engaged with a torque capacity by which the input torque to primary pulley 1 is transmittable.

In this embodiment, engine E coupled to primary pulley 1 is equipped with an idle stop control apparatus in order to improve a fuel economy. When a predetermined condition such that the vehicle speed is in a stop determination state in which the vehicle speed is below a minute set vehicle speed and this stopped vehicle determination state is continued for a set time without intention to start the vehicle is established, the engine is automatically stopped (so called, an idle stop).

In this embodiment, as described above, the vehicle stop determination state in which the vehicle speed is below the minute set vehicle speed for the stop determination purpose is set as the idle stop condition. Thus, the above-described idle stop includes that carried out at the time of the vehicle stop and includes that carried out during a minute speed running at a time immediate before the vehicle stop.

A release of the idle stop control is carried out when such an operation that a vehicle driver carries out the operation such that a brake pedal is released for a brake to be transferred from an operation state to a non-operation state.

This indicates that the vehicle driver has the intention to start the vehicle. At this time, the engine is automatically restarted to release the idle stop control.

During the above-described idle stop, the engine is not driven. Hence, no drained oil is present from engine driven oil pump 4. Then, line pressure $P_L$ cannot be generated. In addition, gear shift control circuit 6 cannot produce gear shift control pressure $P_C$ nor starting frictional element engagement pressure P.

Thus, V-belt 3 cannot be pressed between opposing sheave surfaces of primary pulley 1 and between opposing sheave surfaces of secondary pulley 2 and starting frictional element F/E cannot be engaged. Consequently, the V-belt continuously variable transmission is in a power transmission disabled state.

When the engine is restarted in response to the release of the idle stop control, the working oil is drained from engine driven oil pump 4 driven by the engine to enable the generation of line pressure $P_L$. In addition, gear shift control circuit 6 can produce gear shift control pressure $P_C$ and starting frictional element engagement pressure P. Consequently, the V-belt continuously variable transmission is in the power transmission enabled state according to the productions of these hydraulic pressures.

A response delay is provided until engine driven oil pump 4 drains the working oil in response to the restart of the engine along with the idle stop control release and this causes line pressure $P_L$, gear shift control pressure $P_C$, and starting frictional element engagement pressure $P_S$ to be produced to make the V-belt continuously variable transmission the power transmission enabled state. When, during the response delay, an idle stop release time control in which a vehicle drive system (engine) is made a state responding to the driving operation, a rising engine torque is inputted to the V-belt continuously variable transmission before the power transmission enabled state (in the power transmission disabled state). Thus, such a problem that an ill influence is given on a durability of the transmission is raised.

Therefore, in this embodiment, electrically-powered oil pump 11 is operated during the idle stop in place of engine driven oil pump 4. The working oil from electrically-powered oil pump 11 is used to hold the V-belt continuously variable transmission in a power transmission start immediate before state, as described later.

It should be noted that electrically-powered oil pump 11 is driven by an exclusive use motor 12. Exclusive use motor 12 is of a small sized motor having a minimum output required for the drive of electrically-powered oil pump 11.

A drain port of electrically-powered oil pump 11 is connected to a line pressure oil passage 5 via electrically-powered oil pump oil passage 13. A check valve 14 is inserted in this passage 13 and arranged in a direction to block an oil flow from line pressure oil passage 5.

This check valve 14 serves to prevent line pressure $P_L$ from being disabled to be generated due to a leakage of the working oil to be directed toward the oil pan via electrically-powered oil pump 11 when the working oil is drained from engine driven oil pump 11.

In the above-described structure, gear shift control circuit 6 can generate the hydraulic pressure to make the transmission the state immediate before the power transmission start as will be described below within a gear shift control oil passage including oil passages 5, 9, and 15 with the working oil from electrically-powered oil pump 11 during the idle stop of the engine as the medium. In other words, gear shift control circuit 6 constituting the starting frictional element engagement pressure control section according to the present invention generates the hydraulic pressure to grasp V-belt 3 between opposing sheave surfaces of primary pulley 1 and between opposing sheave surfaces of secondary pulley 2 with no gap therebetween and generates hydraulic pressure $P_S$ (the starting frictional element engagement start immediate before state achieving hydraulic pressure) required for starting frictional element F/E (the forward clutch or reverse brake within the forward-reverse switching mechanism) to operate in a state immediately before the engagement capacity is started to provide against a built-in return spring within oil passage 15. These generations can hold the V-belt continuously variable transmission in the state immediately before the power transmission start.

Gear shift control circuit 6 sets the starting frictional element engagement pressure command value to a control maximum value as will be described in details below so as to direct the working oil within oil passage 5 toward starting frictional element engagement pressure oil passage 15 at maximum without the drainage of the working oil within oil passage 5 to produce starting frictional element engagement pressure $P_S$ corresponding to the starting frictional element engagement start immediate before state achieving hydraulic pressure value determined according to a working oil quantity from electrically-powered oil pump 11, when hydraulic pressure $P_S$ (starting frictional element engagement start immediate before state achieving hydraulic pressure) required for operating its stroke to the state immediately before starting element F/E (the forward clutch or reverse brake within the forward-reverse switching mechanism) starts to provide the engagement capacity is generated within oil passage 15.

Hence, electrically-powered oil pump 11 can be a small-sized electrically-powered oil pump having a small oil pump capacity up to a limit such as to drain the working oil by the quantity required for starting frictional element engagement pressure $P_S$ within oil passage 15 to be equal to the starting frictional element engagement start immediate before state achieving hydraulic pressure value. Electrically-powered oil pump 11 can meet this requirement even if there are constraints of installation space and of cost.

As described above, during the idle stop, the V-belt continuously variable transmission is held in the power transmission start immediate before state. Thus, when the engine is restarted in response to the release of is the idle stop, gear shift control circuit 6 can immediately raise the gear shift control purpose hydraulic pressure from the above-described power transmission start immediate before state achieving hydraulic pressure value generated with the working oil from electrically-driven oil pump 11 as the medium to the hydraulic pressure value for the transmission to be made in the power transmission enabled state, with the working oil from engine driven oil pump 4 as the medium.

Therefore, the V-belt continuously variable transmission can perform the power transmission without slip from a time immediately after the engine is restarted so that a restart response of the vehicle can be improved. In addition, such a problem that the engine output is transmitted to the transmission before the power transmission enabled state so that the ill influence on the durability of the transmission is given can be avoided.

An engine automatic stop controller 21 shown in FIG. 1 executes the above-described idle stop control (idle stop ON or OFF command) and ON or OFF command of electrically-powered oil pump 11 (exclusive motor 12). In addition, engine automatic stop controller 21 executes a control program shown in FIG. 2 and carries out the starting frictional element engagement pressure control at the time of the idle stop control as shown in a timing chart of FIG. 3 in order to achieve the object of the present invention such that electrically-powered oil pump is small-sized.

Engine automatic stop controller 21 inputs a signal from an idle stop allowance condition detection section 22, a signal from an inhibitor switch 23 detecting a selection range of the V-belt continuously variable transmission, signals from starting frictional element input·output revolution sensors 24 which detect starting frictional element input·output side revolution speeds Nci, Nco of starting frictional element F/E, a signal from an engine output system failure determination section 25 which determines whether an engine output control system such as a throttle valve opening angle control system controlling an output of engine E has failed, and a signal from hydraulic pressure sensor 10 described above.

Idle stop allowance conditions detected by idle stop allowance condition detection section 22 include: a pulley ratio which is a revolution speed ratio between pulleys 1, 2 of the V-belt continuously variable transmission; a transmission operation oil temperature; a brake operation state; vehicle speed VSP; accelerator opening angle APO; and a gradient of a road surface on which the vehicle stops.

It should be noted that, for the pulley ratio, the fact that the pulley ratio is in a region proximity of a lowest gear shift ratio is the condition under which the idle stop is allowed, for the transmission operation oil temperature, the fact that the transmission operation oil temperature is in a temperature region after a warm-up driving end is the condition under which the idle stop is allowed, for the brake operation state, the fact that the brake is in the operation state is the condition under which the idle stop is allowed, for vehicle speed VSP, the fact that vehicle speed VSP is a value below the minute set vehicle speed for the vehicle stop determination is the condition under which the idle stop is allowed, for accelerator opening angle APO, the fact that accelerator opening angle APO is in a region in proximity of zero is the condition under which the idle stop is allowed, and, for the gradient of the road surface on which the vehicle is stopped, the fact that the gradient of the road surface on which the vehicle is stopped is in a flat road gradient in the proximity of zero is the condition under which the idle stop is allowed.

First, the idle stop control (idle stop ON or OFF command) and ON or OFF command for electrically-powered oil pump 11 (exclusive use motor 12) that engine automatic stop controller 21 executes will be described below. Engine automatic stop controller 21 determines whether the idle stop is allowed or inhibited (performs the idle stop control allowance determination) on a basis of the idle stop allowance conditions (the pulley ratio, the transmission operation oil temperature, the brake operation state, vehicle speed VSP, and road surface gradient) detected by idle stop allowance detection section 22.

In a case where a determination result of the idle stop control allowance is not "allowed " ("inhibited"), engine automatic stop controller 21 issues an idle stop OFF command to the engine side and issues an electrically-powered oil pump OFF command to electrically-powered oil pump 11 (exclusive use motor 12) so that the engine is continued to be driven without being under the idle stop. V-belt continuously variable transmission is, at this time, under the gear shift control in the usual way according to the working oil from engine driven oil pump 4.

In a case where the determination result of the to idle stop control allowance is "allowed", engine automatic controller 21 issues electrically-powered oil pump ON command to electrically-powered oil pump 11 (exclusive use motor 12) before issuance of idle stop ON or OFF command. Engine automatic stop controller 21 determines whether is electrically-powered oil pump 11 has performed an actual drive in response to this electrically-powered oil pump ON command from a sensor detection value by means of hydraulic pressure sensor 10 and can determine that an electric power system and a control system related to electrically-powered oil pump 11 (exclusive motor 12) are normal and no failure due to stick of foreign matters to electrically-powered oil pump 11 occurs.

In the case where electrically-powered oil pump 11 (exclusive use motor 12) is normal, electrically-powered oil pump 11 (exclusive use motor 12) issues the idle stop ON command to the engine side in response to the allowance of the idle stop control allowance determination to automatically stop the engine.

It should be noted that electrically-powered oil pump ON command is already outputted to electrically-powered oil pump 11 (exclusive use motor 12), electrically-powered oil pump 11 is continuously driven. After the idle stop, the V-belt continuously variable transmission can be in the power transmission start immediate before state according to the working oil from electrically-powered oil pump 11.

Thus, when the engine is restarted in response to the release of the idle stop, the V-belt continuously variable transmission can immediately be in the power transmission enabled state according to the working oil from engine driven oil pump 4.

In a case where electrically-powered oil pump 11 (exclusive use motor 12) has failed, or in a case where the idle stop control allowance determination is "inhibited" although electrically-powered oil pump 11 (exclusive use motor 12) is normal, engine automatic stop is controller 21 issues the idle stop OFF command to the engine side so that the idle stop control in which the engine is automatically stopped is not executed and, at the same time, issues the electrically-powered oil pump OFF command to electrically-powered oil pump 11 (exclusive use motor 12) to stop electrically-powered oil pump 11.

Thus, the idle stop is not executed when electrically-powered oil pump 11 (exclusive use motor 12) has failed. Therefore, such a problem that, due to a forceful execution of the idle stop, the engine revolution is inputted to the V-belt continuously variable transmission in the power transmission disabled state at the time of the engine restart along with the subsequent release of the idle stop so that the ill influence is given on the durability of the transmission can be avoided.

As described above, during the idle stop, the working oil from electrically-powered oil pump 11 causes the V-belt continuously variable transmission to be in the power transmission start immediate before state. Then, engine automatic stop controller 21 serves to prevent the engine revolution from being inputted to the V-belt continuously variable transmission which is in the power transmission disabled state at a time immediately before the engine restart along with the release of the engine idle stop so that the ill influence on the durability thereof is not given. As an assistance of the above-described function, to assure more accurately the above-described function such as to prevent the engine revolution from being inputted to the V-belt continuously variable transmission, engine automatic stop controller 21 performs the following idle stop release time control.

At this time, engine automatic stop controller 21 checks to see whether gear shift control purpose hydraulic pressure (gear shift control hydraulic pressure $P_C$ in an example of FIG. 1, but may be line pressure $P_L$) is equal to or higher than a set hydraulic pressure.

This set hydraulic pressure value is a lowest limit value of the gear shift control purpose hydraulic pressure such that no ill influence is given on the durability of the transmission even when the engine output is inputted to the transmission.

Engine automatic stop controller 21 issues an engine torque down command to the engine side as shown in FIG. 1 at a time before the gear shift control purpose hydraulic pressure (gear shift control pressure $P_C$ or line pressure $P_L$) becomes equal to or higher than the set hydraulic pressure. The engine torque down command is provided in engine automatic stop controller 21 to reduce the engine torque so that the engine torque does not give an ill influence on the durability of the transmission even under such a low gear shift control purpose hydraulic pressure (gear shift control hydraulic pressure $P_C$ or line pressure $P_L$. Then, when gear shift control purpose hydraulic pressure (gear shift control hydraulic pressure $P_C$ or line pressure $P_L$) becomes equal to or higher than the set hydraulic pressure, engine automatic stop controller 21 issues an engine torque recovery command to the engine side as shown in FIG. 1 to execute the idle stop release control of to the engine. The engine torque recovery command is provided in engine automatic stop controller 21 to raise the engine torque progressively in a shock-less time series change manner from the above-described torque down value toward the torque value corresponding to the driving operation.

Figure 2:
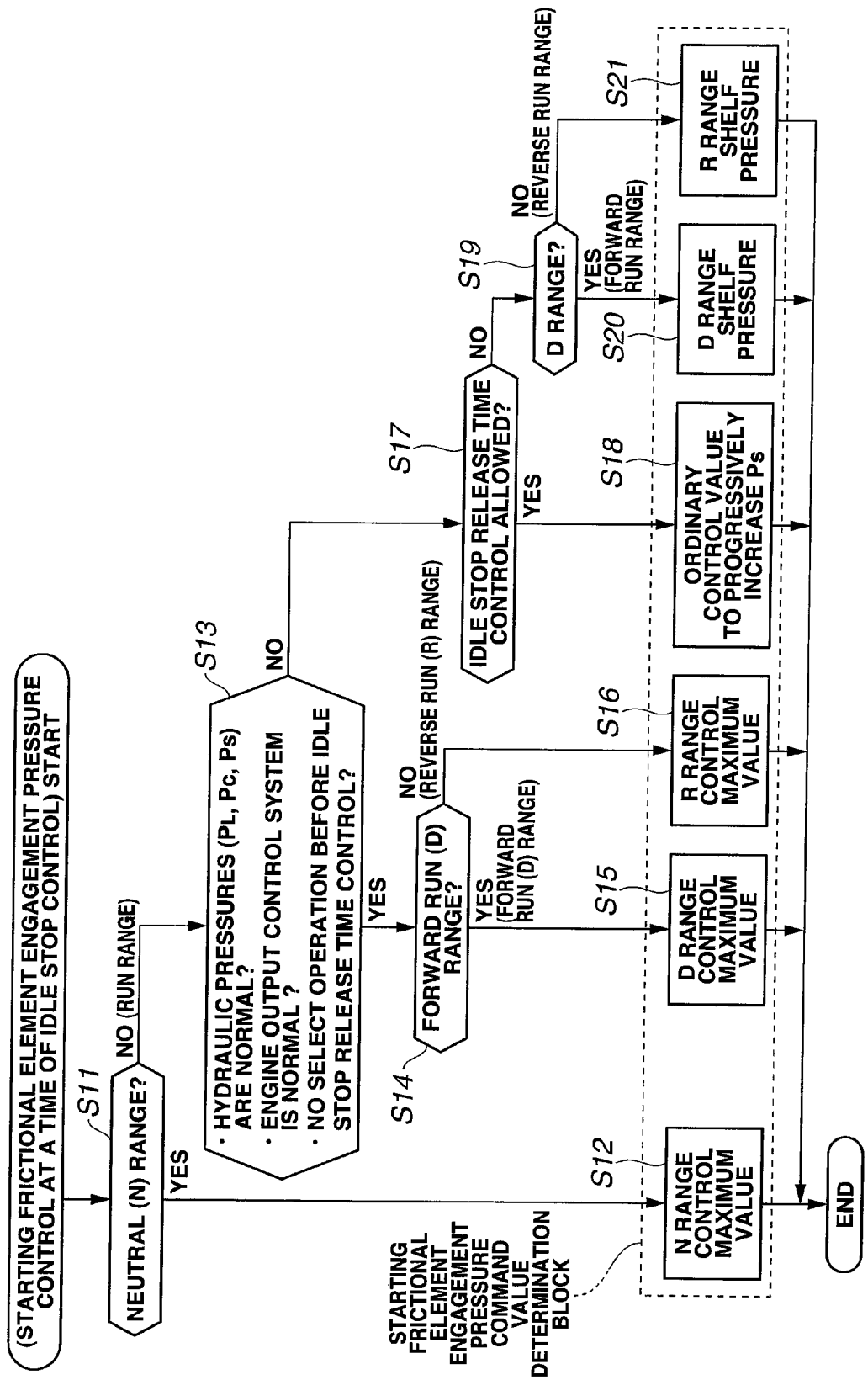
FIG. 2 shows a flowchart representing a starting frictional element engagement pressure control program for the idle stop control purpose which is executed by an engine automatic stop controller.
Figure 3:
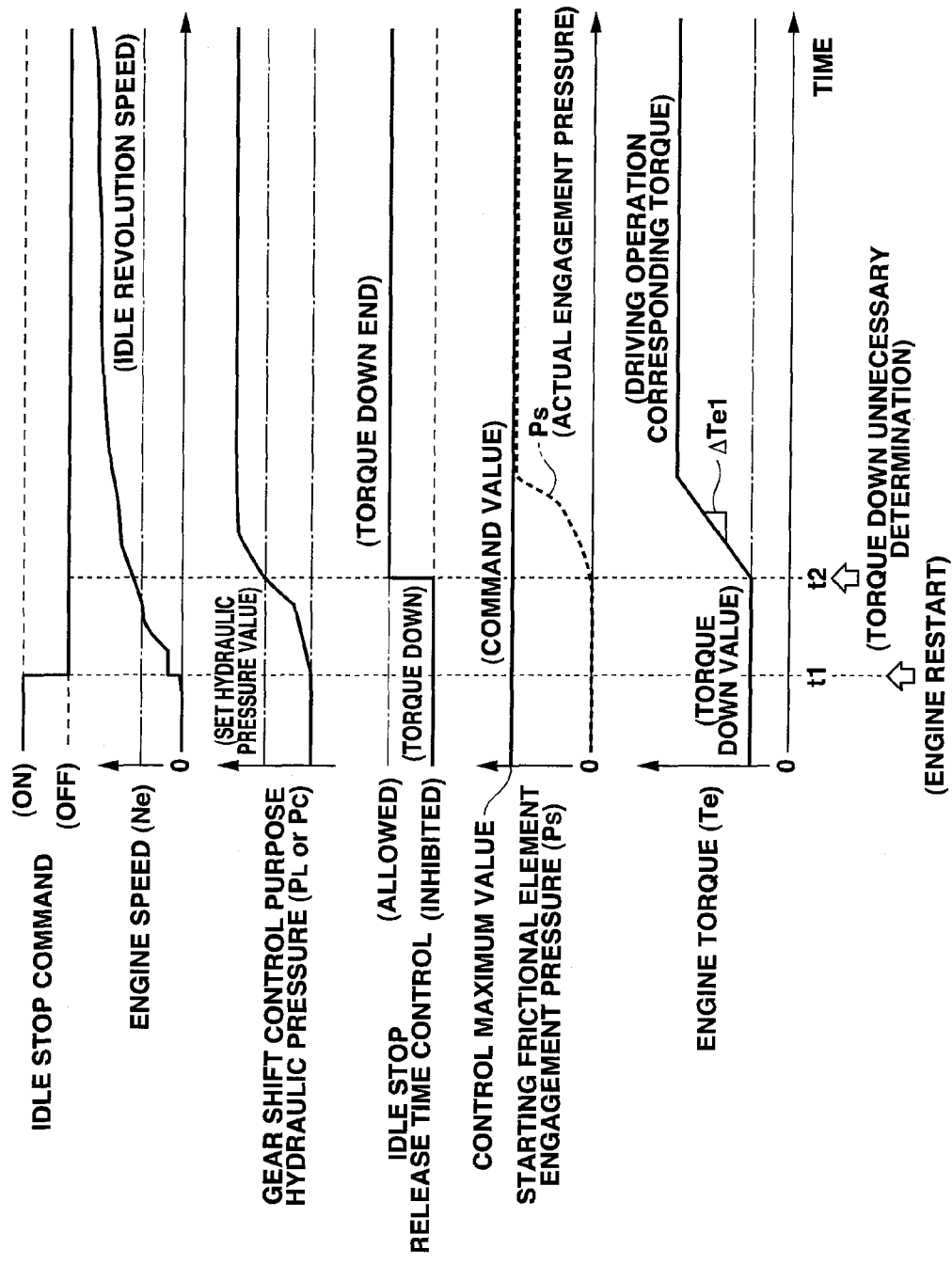
FIG. 3 shows a timing chart representing an operation of the starting frictional element engagement pressure control for the idle stop control purpose shown in FIG. 2 in a case where a system is normal.
Figure 4:
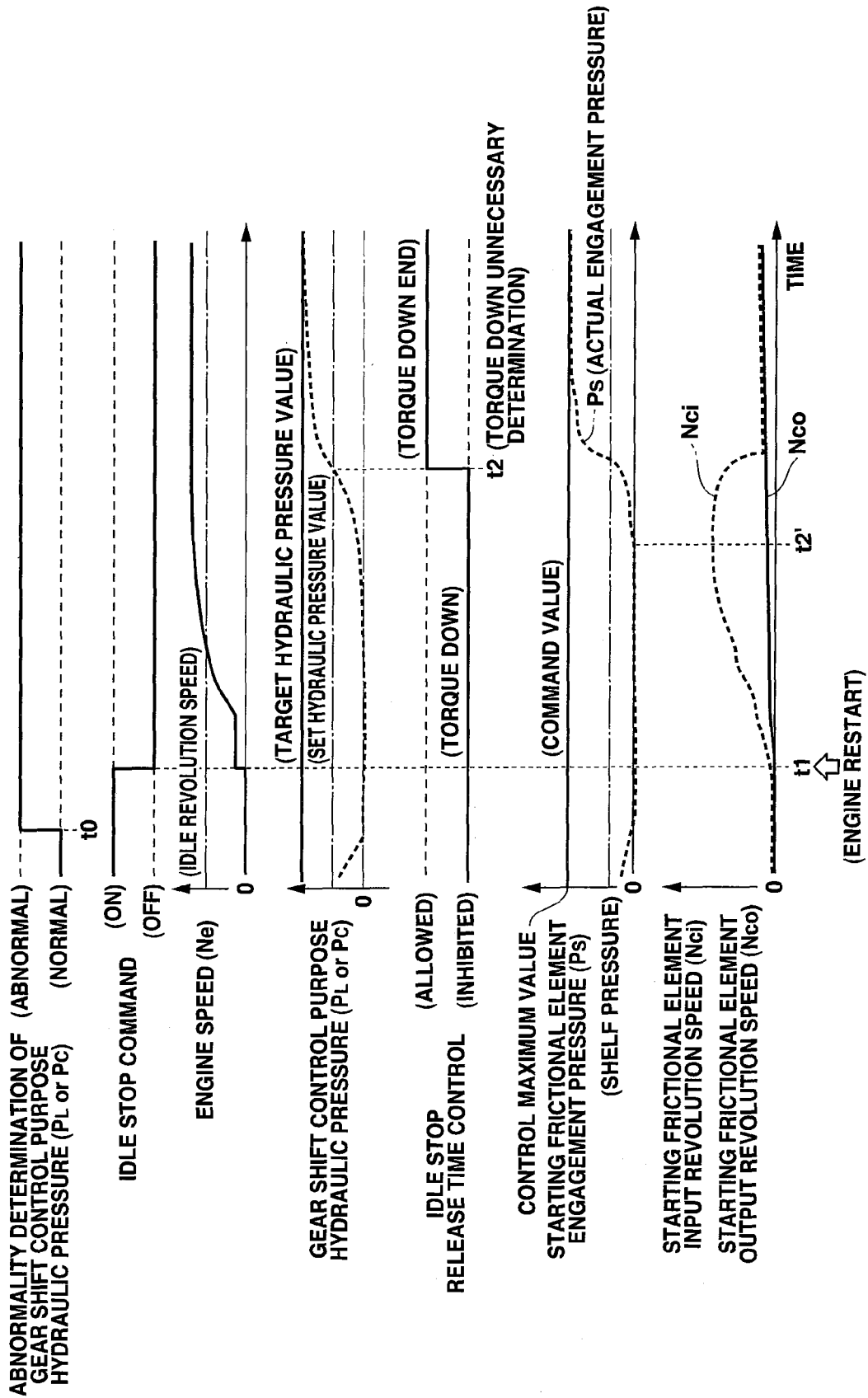
FIG. 4 shows a timing chart representing an operation when the starting frictional element engagement pressure control for the idle stop control purpose shown in FIG. 2 is not carried out in a case where an electrically-powered oil pump of the system has failed.
Figure 5:
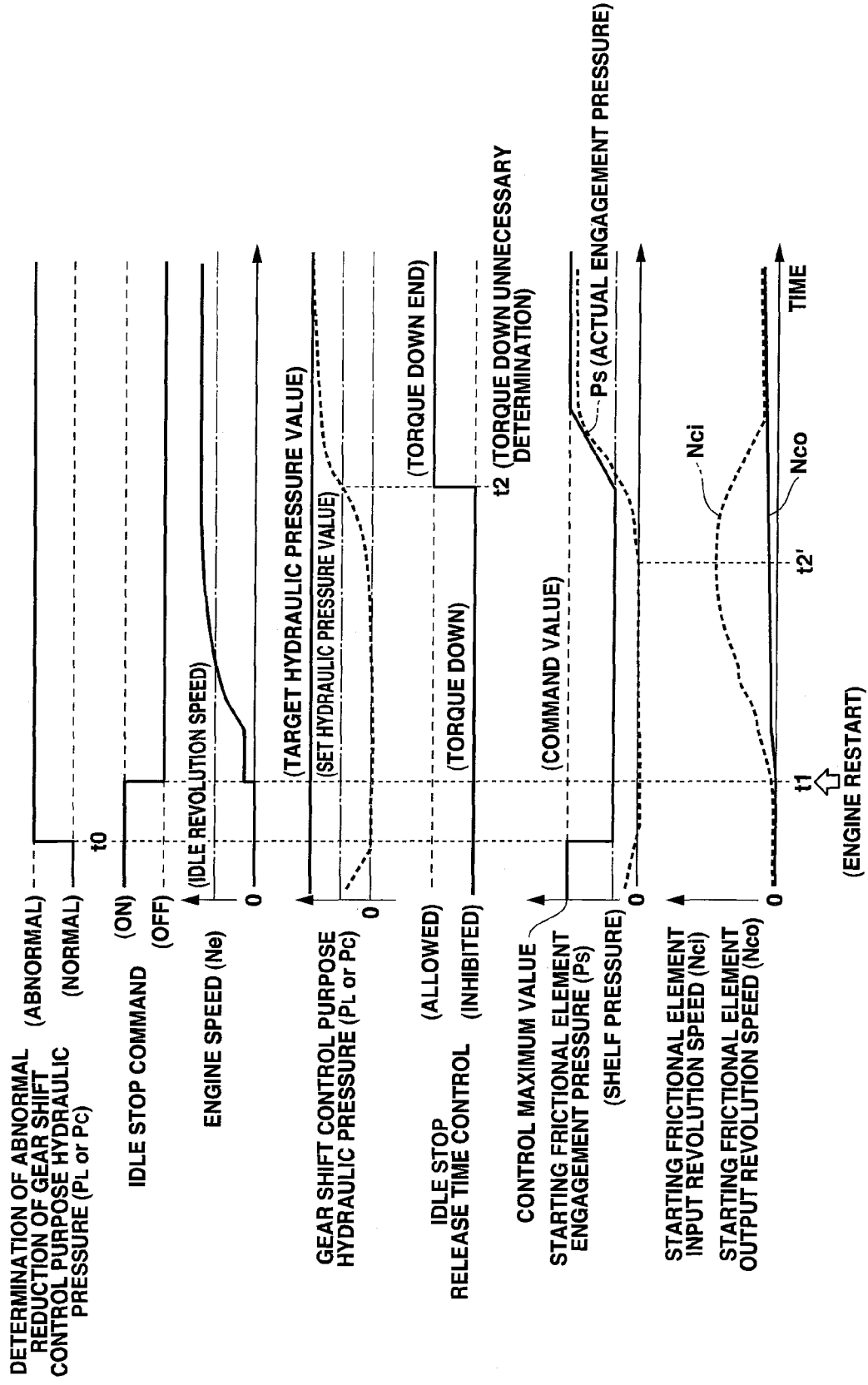
FIG. 5 shows a timing chart representing an operation of the starting frictional element engagement pressure control for the idle stop control purpose shown in FIG. 2 in a case where an electrically-powered oil pump of the system has failed.

It should be noted that, when, during the idle stop, the V-belt continuously variable transmission is held in the power transmission start immediate before state described above, engine automatic stop controller 21 determines a command value for starting frictional element engagement pressure ($P_S$) issued to gear shift control circuit 6 by an execution of a control program shown in FIG. 2 and as shown in timing charts of FIGS. 3 to 5.

At a step S11 shown in FIG. 2, engine automatic stop controller 21 determines whether the V-belt continuously variable transmission is in a neutral (N) range. While the neutral (N) range is selected, engine automatic stop controller 21, at a step S12, assumes the command value for the starting frictional element engagement pressure ($P_S$) to be a control maximum value at the neutral range (N).

If, at step S11, the determination is made that the V-belt continuously variable transmission is not in the neutral (N) range but is in a run range, the routine goes to a step S13.

At step S13, engine automatic stop controller 21 checks to see whether gear shift control purpose hydraulic pressure $P_C$ (or $P_L$) or starting frictional element engagement pressure $P_S$ is normally generated (viz., whether electrically-powered oil pump 11 has failed or not), whether the engine output control system such as the electronically controlled throttle valve is normally operated or not, and whether the switch of the selection range (select operation) before the engine idle stop release time control is started is carried out or not.

If, at step S13, engine automatic stop controller 21 is determines that gear shift control purpose hydraulic pressure $P_C$ (or $P_L$) and starting frictional element engagement pressure $P_S$ are normally generated (electrically-powered oil pump 11 does not fail), determines that the engine output system is normal, and determines that no select operation is carried out before the start of the engine idle stop release time control, the routine goes to a step S14.

At step S14, engine automatic stop controller 21 checks to see whether the run range during the selection is either a forward run (D) range or a reverse run (R) range.

If, at step S14, engine automatic stop controller 21 determines that the forward run range (D) is selected, the routine goes to a step S15. At step S15, the command value for starting frictional element engagement pressure ($P_S$) to gear shift control circuit 6 is set to a control maximum value of the starting frictional element (the forward clutch within the forward-and-reverse switching mechanism) to be engaged at forward run range (D). If, at step S14, engine automatic stop controller 21 determines that the reverse run range (R) is selected, the routine goes to a step S16. At step S16, the command value for starting frictional element engagement pressure ($P_S$) to gear shift control circuit 6 is set to the control maximum value of the starting frictional element F/E (the reverse brake within the forward-and-reverse switching mechanism) to be engaged at the reverse run range (R).

The starting frictional element engagement pressure control described above according to a loop including step S11, step S13, step S15, and step S16 will be described in details on a basis of FIG. 3. FIG. 3 shows an operational timing chart in a case where, at an instantaneous time t1, the engine is restarted in response to the idle stop OFF command, engine revolution speed Ne is raised in the time series variation manner shown in FIG. 3, and, thus, the gear shift control purpose hydraulic pressure (line pressure $P_L$ or gear shift control pressure $P_C$) is raised as shown in FIG. 3 by the working oil from engine driven oil pump 4 and, at an instantaneous time, according to a torque down unnecessary determination made when the gear shift control purpose hydraulic pressure (line pressure $P_L$ or gear shift control hydraulic pressure $P_C$) has reached to the above-described set hydraulic pressure, the idle stop release time control of the engine is allowed and this causes engine torque Te to rise and recover from a value reduced due to the above-described torque down toward the value corresponding to the value corresponding to the driving operation by a predetermined gradient $\Delta Te1$ defined for a shock measurement purpose.

In this embodiment, during the idle stop control including a time of the idle stop and a time of the idle stop release time control after the issuance of the idle stop OFF command, the command value for the starting frictional element engagement pressure ($P_S$) to gear shift control circuit 6 is set to the control maximum value for the forward clutch which is the starting frictional element at the time of the forward run range (D) selection and to the control maximum value for the reverse brake is the starting frictional element at the time of the reverse run range (R) selection.

Therefore, gear shift control circuit 6 does not drain the working oil from electrically-powered oil pump 11 when engagement pressure $P_S$ of starting frictional element F/E (the forward clutch in the D range and the reverse brake in the R range) upon receipt of the above-described engagement pressure command value. Hence, it becomes unnecessary for electrically-powered oil pump 11 to drain the working oil at all including the required drain. Electrically-powered oil pump 11 can be the small-sized electrically-powered oil pump having the small pump capacity and can sufficiently cope with the constraint of the installation space and the constraint of the cost.

If, at step S13 in FIG. 2, engine automatic stop controller 21 determines that gear shift control purpose hydraulic pressure $P_C$ (or $P_L$) and starting frictional element engagement pressure $P_S$ are not normally generated (electrically-powered oil pump 11 has failed), determines that the engine output control system is not normal, or determines that the select operation has been carried out before the idle stop release time control of the engine is started, control is advanced to a step S17.

At step S17, engine automatic stop controller 21 checks to see whether the idle stop release time control of the engine is allowed and the idle stop release time control in which engine torque Te is raised and recovered from the torque down value toward the driving operation responding value is executed.

If the idle stop release time control of the engine is executed, the routine goes to a step S18 in which engine automatic stop controller 21 progressively increases the command value for starting frictional element engagement pressure ($P_S$) issued to gear shift control circuit 6 in a usual way in order for starting frictional element F/E to have the engagement capacity which can accurately transmit rising engine torque Te under a shock prevention situation due to the execution of the idle stop release time control.

In a case where engine automatic stop controller 21 determines that the engine is not yet allowed (is not yet executed) at step S17, control is advanced to a step S19. At step S19, engine automatic stop controller 21 checks to see whether the selected run range is either the forward run range (D) or the reverse run range (R).

If, at step S19, engine automatic stop controller 21 determines that the forward run range (D) is selected, control is advanced to a step S20 in which engine automatic stop controller 21 sets the command value for starting frictional element (the forward clutch within the forward-and-reverse switching mechanism) issued to gear shift control circuit 6 to an intermediate shelf pressure smaller than the control maximum value of the starting frictional element (the forward clutch within the forward-and-reverse switching mechanism) to be engaged at the forward run (D) range, preferably a return spring equivalent pressure required for the starting frictional element (the forward clutch) to be in the engagement start immediate before state against the built-in return spring.

If, at step S19, engine automatic stop controller 21 determines that the reverse run range (R) is selected, control is advanced to a step S21 in which engine automatic stop controller 21 sets the command value for starting frictional element (the reverse brake within the forward-and-reverse switching mechanism) issued to gear shift control circuit 6 to an intermediate shelf pressure smaller than the control maximum value of the starting frictional element (the forward clutch within the forward-and-reverse switching mechanism) to be engaged at the reverse run (R) range, preferably the return spring equivalent pressure required for the starting frictional element (the reverse brake) to be in the engagement start immediate before state against the built-in return spring.

The above-described starting element engagement pressure control according to the loop including step S11, step S13, step S17, step S19, step S20, and step S21 will be described below on a basis of FIGS. 4 and 5 and FIGS. 6 and 7.

FIG. 4 shows an operational timing chart in a case where, after an instantaneous time t0 at which engine automatic stop controller 21 determines, at step S13 in FIG. 2, that gear shift control purpose hydraulic pressure $P_C$ (or $P_L$) and starting element frictional element engagement pressure $P_S$ are not normally generated (electrically-powered oil pump 11 has failed), the command value for starting friction& element engagement pressure ($P_S$) according to the execution of step S15 or step S16 is set to the control maximum value as shown in FIG. 4.

The following problem occurs when the command value for the starting frictional element engagement pressure ($P_S$) is set to the control maximum value during the idle stop up to to instantaneous time t1 and during a thereafter time at an instantaneous time t2 at which the idle stop release time control of the engine is started in response to the torque down unnecessary command determination in spite of the fact that an abnormality determination that gear shift is control purpose hydraulic pressure $P_C$ (or $P_L$) and starting frictional element engagement pressure $P_S$ are not normally generated due to the failure of electrically-powered oil pump 11 is made at instantaneous time t0.

That is to say, if gear shift control purpose Hydraulic pressure $P_C$ (or $P_L$) and starting frictional element engagement pressure $P_S$ are not normally generated due to the failure of electrically-powered oil pump 11, starting frictional element F/E slips due to an insufficient pressure of starting frictional element engagement pressure $P_S$ and its revolution speed Nci thereof is often raised.

In this case, after an instantaneous time t2' at which engine driven oil pump 4 starts to drain the working oil due to the revolution rise after the restart of the engine to enable the control of starting frictional element engagement pressure $P_S$, a large deviation occurs between original starting frictional element engagement pressure $P_S$ and the command value which is set to the control maximum value. Thus, starting frictional element engagement pressure $P_S$ is abruptly raised as shown in FIG. 4 so that starting frictional element F/E is abruptly engaged as appreciated from an abrupt reduction in its input revolution speed Nci. Consequently, an engagement shock occurs.

On the other hand, as described in this embodiment, if engine automatic stop controller 21 determines that gear shift control purpose hydraulic pressure $P_C$ (or $P_L$) and starting frictional element engagement pressure $P_S$ are not normally generated at step S13 in FIG. 2 (namely, electrically-powered oil pump 11 has failed), the command value for starting frictional element engagement pressure ($P_S$) under the execution of step S20 or step S21 is set to the intermediate shelf pressure smaller than the control maximum value (preferably, the return spring equivalent pressure for the starting frictional element to be in the engagement start immediate before state). In this case, the problem on the shock can be eliminated as described with reference to FIG. 5.

FIG. 5 shows an operation timing chart under the same condition as FIG. 4 but shows the operation timing chart in a case where the command value for starting frictional element engagement pressure ($P_S$) according to the execution of step S15 or step S16 is set to the intermediate shelf pressure (preferably the return spring equivalent pressure for the corresponding starting frictional element to be the engagement start immediate before state) smaller than the control maximum value after instantaneous time t0 at which engine automatic stop controller 21 determines, at step S13 in FIG. 2, that gear shift control purpose hydraulic pressure $P_C$ (or $P_L$) and starting frictional element engagement pressure $P_S$ are not normally generated (electrically-powered oil pump 11 has failed) and up to instantaneous time t2 at which the engine idle stop release time control is allowed.

In this case, after an instantaneous time t2' at which the control of starting frictional element engagement pressure $P_S$ becomes enabled due to the discharge of the working oil through engine driven oil pump 4 according to the revolution rise of the engine after the engine restart, the deviation between original starting frictional element engagement pressure $P_S$ and the command value which is set to a shelf pressure smaller than the control maximum value is small.

Thus, the command value for the starting frictional element engagement pressure ($P_S$) is progressively increased by a predetermined gradient as shown in FIG. 5 according to the execution of step S18 after instantaneous time t2 at which the idle stop release time control of the engine is allowed and starting frictional element engagement pressure $P_S$ is slowly raised as shown in FIG. 4.

As appreciated from a slow reduction of input revolution speed Nci of starting frictional element F/E, starting frictional element F/E can progressively be engaged so that the generation of engagement shock can be prevented.

It should be noted that, even in a case where, in this embodiment, engine automatic stop controller 21 determines that the engine output control system such as electronically-controlled throttle valve is not normally operated at step S13 in FIG. 2, the command value for starting frictional element engagement pressure ($P_S$) according to the execution of step S20 or step S21 before the idle stop release time control of the engine is allowed (step S17) is set to the shelf pressure smaller than the control maximum value. Then, the following actions and advantages can be obtained.

In other words, if, even if the engine output control system is not normal, the command value for starting frictional element engagement pressure ($P_S$) is set to the control maximum value according to the execution of step S15 or step S16, the working oil by the predetermined quantity cannot be drained from engine driven oil pump 4 even if the engine is started and engagement pressure $P_S$ advances the engagement of starting frictional element F/E according to the control of engagement pressure of starting frictional element F/E based on the command value for starting frictional element engagement pressure ($P_S$) which is set to the control maximum value, although the transmission is not in the power transmission enabled state. In this case, the engine power is inputted to the transmission which is not yet in the power Transmission enabled state so that the ill influence is given on the durability of the transmission and the problem such that a large shock is developed when the transmission becomes, thereafter, the power transmission enabled state.

Whereas, in this embodiment, when engine automatic stop controller 21 determines that the engine output control system is not normal at step S13 in FIG. 2, the command value for starting frictional element engagement pressure ($P_S$) is set to the intermediate shelf pressure smaller than the control maximum value according to the execution of step S20 or step S21 (preferably the return spring equivalent pressure for the starting frictional element to be in the engagement start immediate before state). In this case, since the control of starting frictional element engagement pressure $P_S$ based on the command value for starting frictional element engagement pressure ($P_S$) does not advance the engagement exceeding starting frictional element F/E to be in a shelf pressure responding state (engagement start immediate before state). Hence, the engine power is not inputted to the transmission which is not yet in the power transmission enabled state. Thus, no ill influence is given on the durability of the transmission and, even when the transmission becomes, thereafter, the power transmission enabled state, the problem of generating the large shock can be eliminated.

Figure 6:
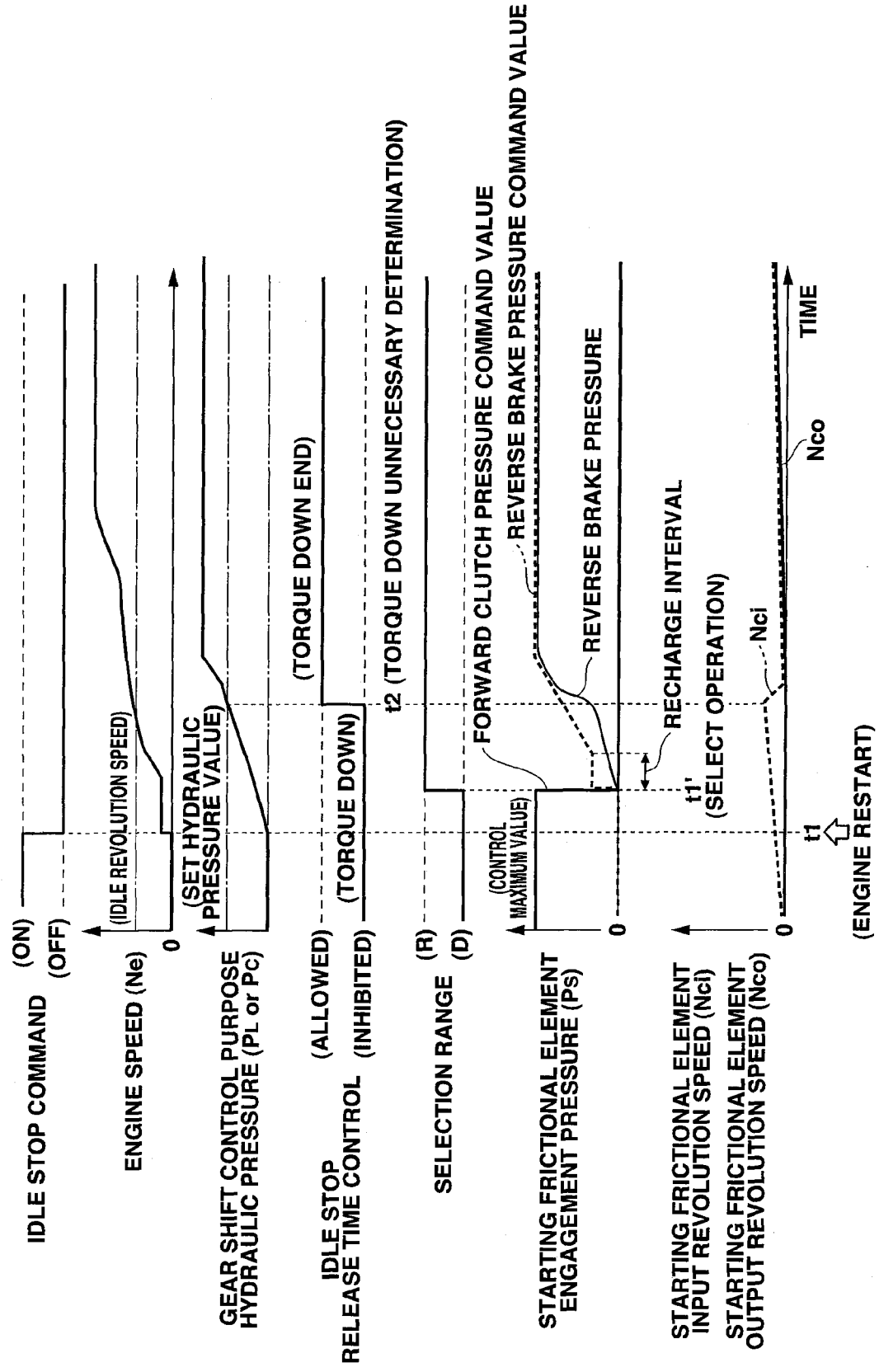
FIG. 6 shows a timing chart representing an operation when the starting frictional element engagement pressure control for the idle stop control purpose shown in FIG. 2 is not performed in a case where a range switching of the transmission is performed during a time duration from a time at which the engine is restarted in response to engine idle stop OFF command to a time at which the engine idle stop release time control of the engine is started in response to a torque down unnecessary determination.

FIG. 6 shows a timing chart in a case where engine automatic stop controller 21 determines, at step S13 in FIG. 2, that the selection range is switched (D→R range select operation) at an instantaneous time t1' which is present between instantaneous time t1 at which the engine is restarted in response to the idle stop OFF command and instantaneous time t2 at which the idle stop release time control of the engine is allowed but a shelf pressure command control according to the execution of step S20 or step S21 is not executed.

It is necessary to release the forward clutch (the starting frictional element in the D range) which is in the engaged state in the D range and to engage the reverse brake which is the starting frictional element of the R range in response to the select operation from the D range to the R range at instantaneous time t1'.

Therefore, the command value of the forward clutch engagement pressure of starting frictional element pressure $P_S$ is set from the control maximum value to zero at instantaneous time t1' as shown in FIG. 6.

An exhaust of the forward clutch hydraulic pressure releases the forward clutch. Then, during a pre-charge interval of time, the command value of the reverse brake hydraulic pressure is a pre-charge pressure in order for the reverse brake to speedily finish the stroke and to be in the engagement start immediate before state.

Thereafter, the reverse brake hydraulic pressure is raised to the control maximum value by the predetermined gradient.

The working oil quantity from engine driven oil pump 4 is small quantity up to instantaneous time t2 at which the idle stop release time control (engine torque increase recovery control) of the engine in response to the torque down unnecessary determination is started. When the reverse brake pressure follows the command value set as described above, the large response delay is provided for this command value.

During this time, even under the above-described situation, the command value of the reverse brake hydraulic pressure is set in the ordinary way as described above to contribute on the control of the reverse brake pressure so that the reverse brake pressure is abruptly raised as shown in FIG. 6 when the working oil quantity from engine driven oil pump 4 during the idle stop release time control (engine torque increase recovery control) become increased at instantaneous time t2.

Therefore, as appreciated from an abrupt approach situation of input revolution speed Nci of the reverse brake with respect to output revolution speed Nco after instantaneous time t2, the reverse brake is abruptly engaged and the problem of the generation of shock occurs.

If, in this embodiment, engine automatic stop controller 21 determines that the switch of the selection range (D→R select operation) has been carried out during a time duration from the time at which the engine is restarted in response to the idle stop OFF command to a time at which the start of the engine idle stop release control is allowed (step S17), a shelf pressure command control is performed according to the execution of step S20 or step S21. Hence, as will be described with reference to FIG. 7, the problem related to the above-described shock can be eliminated.

Figure 7:
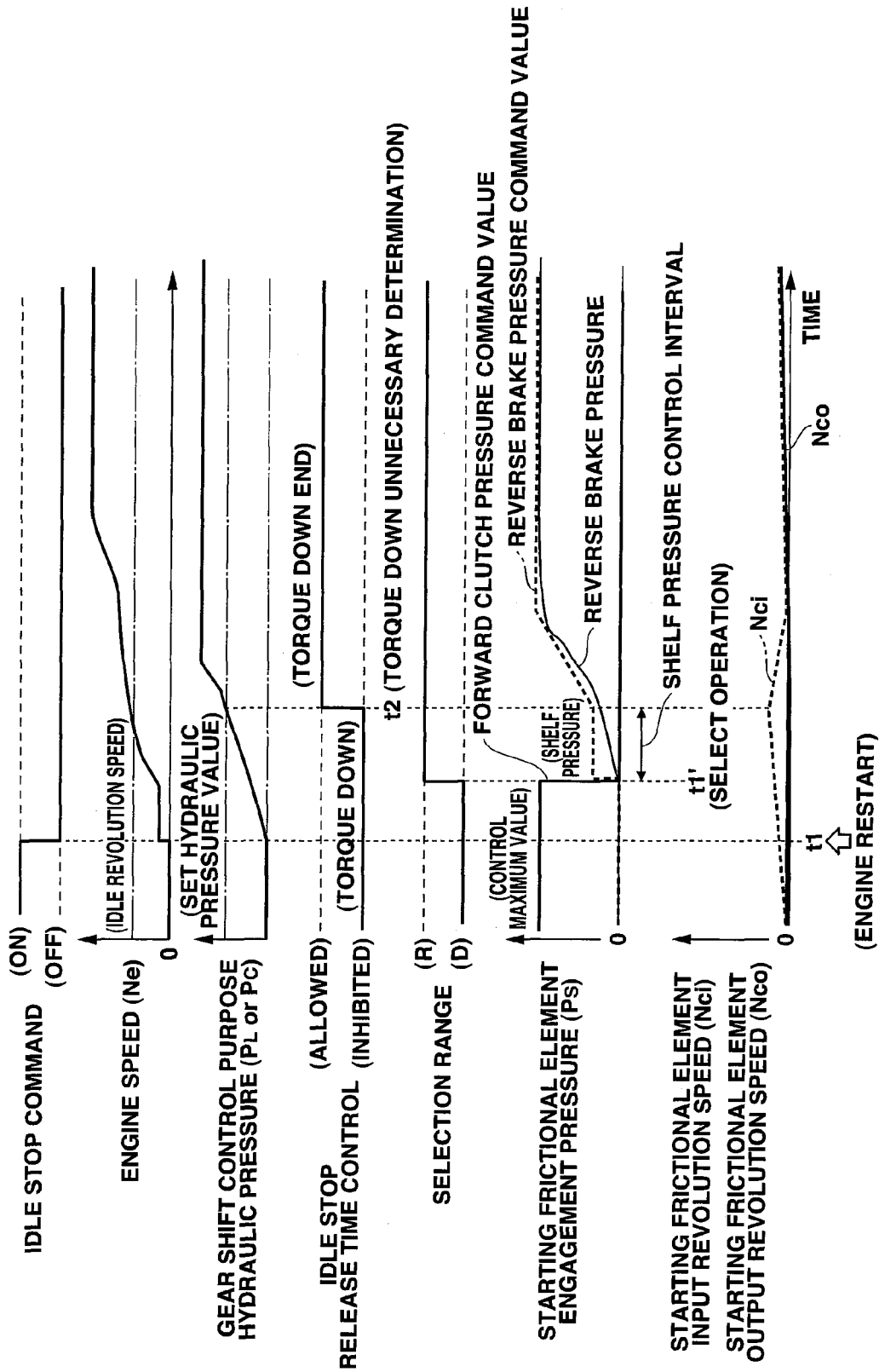
FIG. 7 shows a timing chart representing an operation of the starting frictional element engagement pressure control for the idle stop control purpose shown in FIG. 2 in a case where the range switching is performed in the same way as FIG. 6.

FIG. 7 shows an operation timing chart under the same condition of FIG. 6 but when the shelf pressure command control according to the execution of step S20 or step S21 is carried out in a case where the switch of the selection range (D→R select operation) at instantaneous time t1' is determined to be carried out, instantaneous time ti' being between instantaneous time t1 at which the engine is restarted in response to the idle stop OFF command (step S13 in FIG. 2) and instantaneous time t2 at which idle stop release time control of the engine is allowed.

In details, during a time duration from instantaneous time t1' at which D→R select operation determination is made to instantaneous time t2 at which an idle stop release time control start of the engine is allowed is a shelf pressure control interval, the command value of reverse brake pressure which is starting frictional element engagement pressure $P_S$ is maintained at the shelf pressure (preferably, the return spring equivalent pressure by which the reverse brake is in the engagement start immediate before state), and, thereafter, according to the execution of step S18, the command value of the reverse brake pressure is progressively increased by the predetermined gradient as shown in FIG. 7 from the shelf pressure.

In this case, even if the working oil quantity from engine driven oil pump 4 is the small quantity up to instantaneous time t2 at which the engine idle stop release time control of the engine (engine torque increase recovery control) is started, the command value of the reverse brake pressure is held at the shelf pressure (preferably, the return spring equivalent pressure for the reverse brake to be in the engagement start immediate before state) during a time duration from instantaneous time t1' at which D→R select operation is determined to be carried out to instantaneous time t2 at which the engine idle stop release time control is started. Hence, when the reverse brake pressure follows the command value described above, the large response delay of the reverse brake pressure with respect to this command value does not occur.

When the working oil quantity from engine driven oil pump 4 becomes increased during the idle stop release time control during the idle stop release time control (engine torque increase recovery control) at instantaneous time t2, the reverse brake pressure is not abruptly raised and slowly raised as shown in FIG. 7 along the time series variation of the command value.

Therefore, as appreciated from an abrupt approach situation of input revolution speed Nci of the reverse brake with respect to output revolution speed Nco thereof after instantaneous time t2, the reverse brake is smoothly engaged and the problem of the generation of the shock during the engagement of the reverse brake is not developed.

Figure 8:
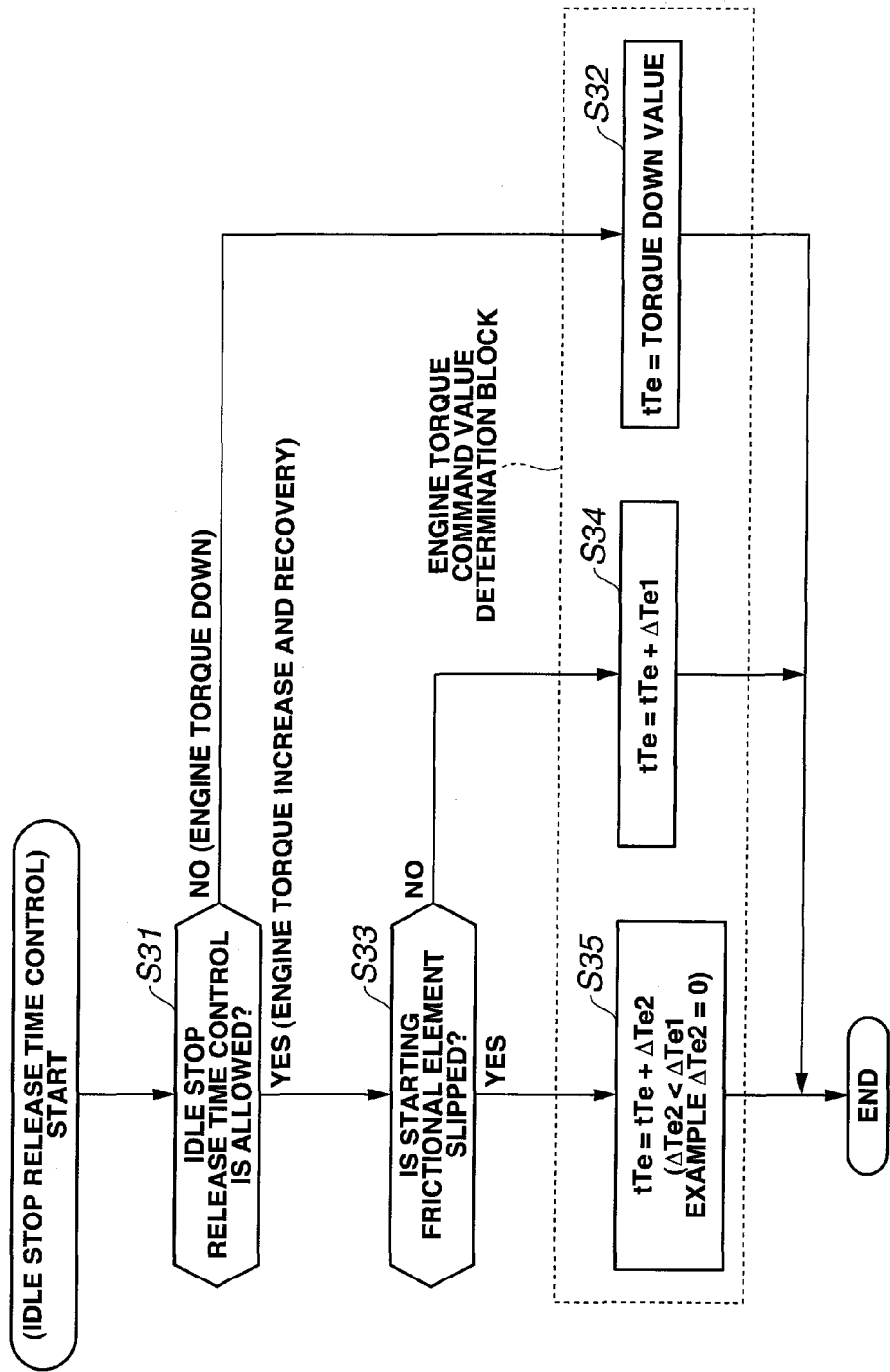
FIG. 8 shows a flowchart representing a reference example of an idle stop release time control program of the engine executed by the engine automatic stop controller shown in FIG. 1.

FIG. 8 shows a reference example of the idle stop release time control of the engine which is to be executed by engine automatic stop controller 21 shown in FIG. 1.

That is to say, at a step S31, engine automatic stop controller 21 checks to see whether the idle stop release time control in which the engine torque is increased and recovered to the driving operation responding value should be allowed or not according to the determination that the torque down of the engine is not needed.

If the idle stop release time control of the engine should not be allowed (the engine torque down should be continued), control is advanced to a step S32 in which an engine torque command tTe is a torque down value and engine automatic stop controller 21 transmits this engine torque command value tTe (=torque down value) to the engine as the engine torque recovery command as shown in FIG. 1 to perform the engine torque down to achieve the above-described requirement.

If, at step S31, the engine torque down is determined to be ended (the idle stop release time control should be allowed), engine automatic stop controller 21 checks to see whether the starting frictional element has been slipped at a step S33. Upon this check, engine automatic stop controller 21 calculates a difference revolution between input revolution speed Nci of the starting frictional element and output revolution speed Nco thereof (a slip quantity) ΔNc (=Nco−Nci) and can determine that the starting frictional element has slipped from a time point at which this difference revolution ΔNc is equal to or larger than a slip generation threshold value ΔNcin to a time point at which difference revolution ΔNc is below a slip elimination threshold value ΔNcout (<ΔNcin).

While, at step S33, engine automatic stop controller 21 determines that starting frictional element does not slip, at a step S34, engine torque command value tTe is a value which becomes larger by each predetermined value ΔTe1 (refer to FIG. 3) defined for the shock countermeasure. Then, engine automatic stop controller 21 transmits this engine torque command value tTe to the engine side as the engine torque recovery command as shown in FIG. 1. Thus, engine torque Te is increased by a time variation gradient corresponding to predetermined value ΔTe1 as shown in FIG. 3.

While engine automatic stop controller 21 determines that the starting frictional element has been slipped, control is advanced to a step S35 in which engine torque command value tTe is a value which becomes larger by a predetermined value ΔTe2 (<ΔTe1) and engine automatic stop controller 21 transmits this engine torque command value tTe to the engine side as the engine torque recovery command as shown in FIG. 1. Thus, engine torque Te is increased by the time variation gradient corresponding to predetermined value ΔTe2. This predetermined value ΔTe2 is further smaller than predetermined value ΔTe1 for the shock countermeasure and may, for example, be zero by which engine torque Te is not varied.

The idle stop release time control of the engine according to the flowchart of FIG. 8 will be described in details on a basis of FIGS. 9 and 10.

Figure 9:
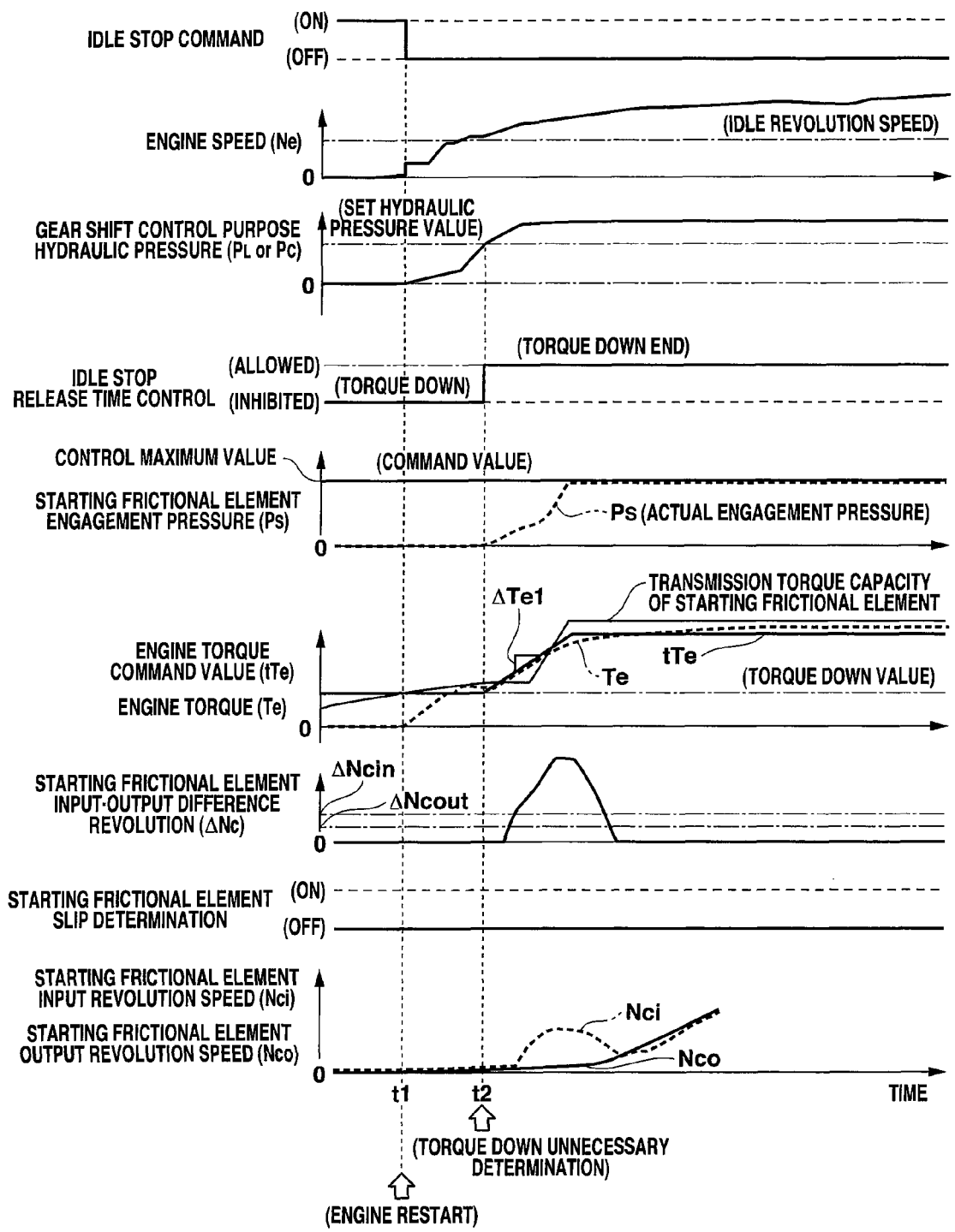
FIG. 9 shows a timing chart representing an operation in a case where the idle stop release time control shown in FIG. 8 is not performed although the starting frictional element slips.

FIG. 9 shows a timing chart in a case where the execution of step S34 causes engine torque command value tTe uniquely to be increased and recovered by the gradient corresponding to ΔTe1 without execution of the slip determination of the starting frictional element at step S33 and, hence, without execution of step S35.

FIG. 9 shows an operation timing chart in a case where the engine is restarted in response to the idle stop OFF command at instantaneous time t1 and engine speed Ne is raised in the time series variation manner shown in FIG. 9, thus gear shift control purpose hydraulic pressure (line pressure $P_L$ or gear shift control pressure $P_C$) is raised as shown in FIG. 9 by the working oil from engine driven oil pump 4, the engine idle stop release control of the engine is allowed according to the torque down unnecessary command determination made for gear shift control purpose hydraulic pressure (line pressure $P_L$ or gear shift control pressure $P_C$) to reach to the set hydraulic pressure at instantaneous time t2, and, thus, engine torque command value tTe is raised and recovered by predetermined gradient ΔTe1 defined for the shock countermeasure from the torque down value to the driving operation corresponding value so that engine torque is raised as shown in FIG. 9.

Although, after instantaneous time t2, the starting frictional element largely slips as shown in FIG. 9, engine torque command value tTe continues to be raised by predetermined gradient ΔTe1 for the shock countermeasure.

In this case, since the command value for starting frictional element engagement pressure $P_S$ is set to the control maximum value and the rise in starting frictional element engagement pressure $P_S$ cannot be desired due to the increase of the command value described above, the slip of the starting frictional element is not speedily converged.

On the other hand, engine torque Te rises to follow engine torque command value tTe which rises by predetermined gradient ΔTe1 so that the slip convergence of the starting frictional element is, furthermore, delayed.

Thus, the problem such that the durability of the starting frictional element is remarkably reduced due to these reasons occurs.

Incidentally, in this embodiment, when the idle stop release time control of the engine is performed on a basis of a determination result at step S31 in FIG. 8 and engine automatic stop controller 21 determines, at step S33, that the slip of the starting frictional element has occurred, the execution of step S35 causes engine torque command value tTe to be increased by predetermined gradient ΔTe2 (in this embodiment, zero) smaller than predetermined gradient ΔTe1 for shock countermeasurement (step S34). Hence, this embodiment can eliminate the above-described problem as described below with reference to FIG. 10 which shows an operation timing chart in the case described above.

Figure 10:
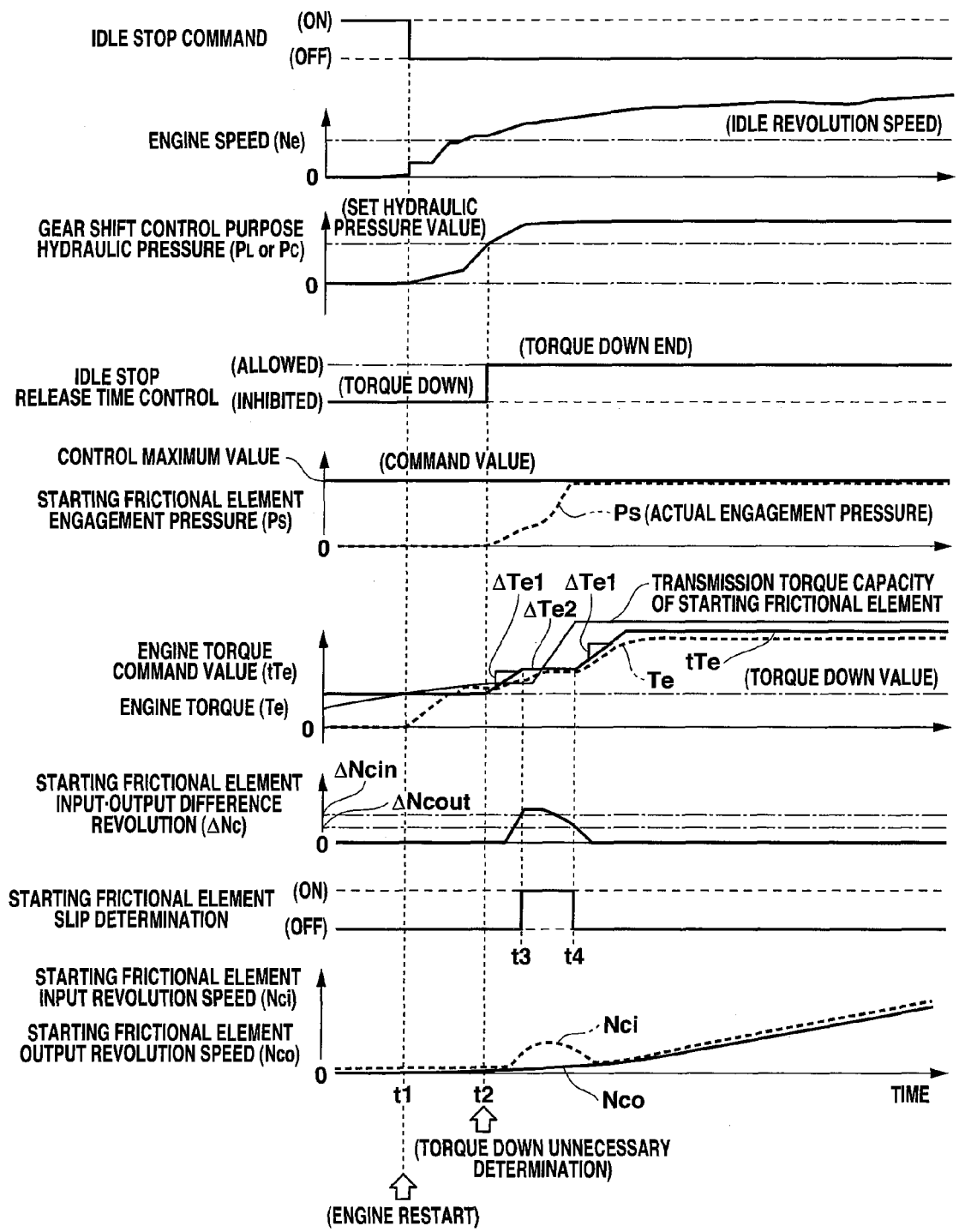
FIG. 10 shows a timing chart representing an operation of the idle stop release time control shown in FIG. 8 in a case where the starting frictional element slips.

FIG. 10 shows an operation timing chart under the same condition as FIG. 9 but shows a case where, during a time interval from an instantaneous time t3 at which difference revolution ΔNc of the starting frictional element is, at step S33 of FIG. 8, determined to be equal to or higher than slip generation threshold value ΔNcin to an instantaneous time t4 at which difference revolution ΔNc of the starting frictional element is determined to be below slip elimination threshold value ΔNcout (<ΔNcin), engine automatic stop controller 21 determines that the starting frictional element has slip generated and turns a starting frictional element slip determination to ON.

During this interval, the execution of step S35 of FIG. 8 causes engine torque command value tTe to be increased by predetermined gradient ΔTe2 (=0). Hence, engine is torque command value tTe, as a consequence, holds the value at a slip generation determination start time t3 to a slip elimination determination time t4 as shown in FIG. 10.

The rise in engine torque Te is accordingly relieved or zeroed during an interval of time from instantaneous time t3 to instantaneous time t4. On the other hand, during this time interval, starting frictional element engagement pressure $P_s$ is raised as shown in FIG. 10 due to the working oil supply from engine driven oil pump 4.

The slip of the starting frictional element speedily converges as compared with the case of FIG. 9, as appreciated from a magnitude of separation between input and output revolution speeds Nci and Nco. In addition, the slip quantity itself becomes small as compared with the case of FIG. 9 as appreciated form the magnitude of difference revolution ΔNc.

Therefore, the above-described problem such that the durability of the starting frictional element is remarkably reduced due to the slip thereof can be avoided.

A point of the present invention of an engagement control apparatus for a starting frictional element at a time of the idle stop control according to the present invention will be explained with reference to FIG. 1.
(The Ordinary Control of the Starting Frictional Element)
As shown in FIG. 1, the transmission is provided with starting frictional element F/E. This starting frictional element F/E in the case of CVT, as in the case of the preferred embodiment, corresponds to a forward-and-reverse switching clutch and, in the case of a stepwise automatic transmission, corresponds to a forward-and-reverse first-speed selection clutch or to a reverse stage selection clutch.

The transmission torque capacity of the starting frictional element is a value set in accordance with the magnitude of the input torque and is set to a larger value as the input torque becomes larger. This transmission torque capacity is a value determined according to the engagement pressure (a clutch hydraulic pressure) of the starting frictional element. Hence, as the input torque becomes larger, the clutch hydraulic pressure becomes higher to increase the transmission torque capacity.

The clutch hydraulic pressure (engagement pressure) is controlled by means of a clutch hydraulic pressure control valve (a clutch regulator valve) 26. This clutch hydraulic pressure control valve 26 is a pressure reducing valve generating the clutch hydraulic pressure, with a constant source pressure reduced, this pressure reduction being achieved by draining the source pressure. To what degree the source pressure is drained is determined according to an opening angle of a drain port of the clutch hydraulic pressure control valve.

A spool position of clutch hydraulic pressure control valve 26 is controlled to provide the clutch pressure (=drain port opening angle) in accordance with the input torque.

In other words, the clutch hydraulic pressure command value is determined in accordance with the input torque and a current equivalent to a spool position corresponding to the clutch hydraulic pressure command value is applied to a solenoid of the clutch hydraulic pressure control valve 26.
(Problem)

However, in a case where the ordinary control described above is directly applied to the vehicle in which the idle stop control apparatus (section) is mounted, the following problem occurs. That is to say, during the idle stop (during the engine stop), the input torque of the starting frictional element is zero. Thus, the transmission torque capacity of the starting frictional element may be zero. If the ordinary control were directly used, the clutch hydraulic pressure (engagement pressure) command value would be reduced to the clutch hydraulic pressure which is immediately before the engagement start (an engagement start point refers to a point at which the engagement is started in a process in which the starting frictional element is from a complete release state to an engagement state).
(Feature)

During the operation of the idle stop control, the drain port opening angle of clutch hydraulic pressure control valve 26 for the clutch hydraulic pressure command value is made small as compared with the drain port opening angle thereof under the ordinary control (difficult to drain).
(Advantage)

Consequently, the drainage quantity can be suppressed and it becomes unnecessary to make electrically-powered oil pump 11 unnecessarily large.

INDUSTRIAL APPLICABILITY

It should be noted that, in the above-described embodiment, the transmission is the V-belt continuously variable transmission but the present invention is not limited to this. The present invention is directly applicable to the stepwise automatic transmission and to an automated manual transmission in which a manual transmission is automatically gear shifted. The concept of the present invention is directly applicable thereto and the same action and advantage can be achieved.

EXPLANATION OF SIGNS

E engine
T/C torque converter
F/E starting frictional element
1 primary pulley
2 secondary pulley
3 V-belt
4 engine driven oil pump
5 line pressure oil passage
6 gear shift control circuit
7 driving condition detection means
8 primary pulley pressure oil passage
9 gear shift control pressure oil passage
10 hydraulic pressure sensor
11 electrically-powered oil pump
12 exclusive use motor
13 electrically driven oil pump oil passage
14 check valve
15 starting frictional element engagement pressure oil passage
21 engine automatic stop controller
22 idle stop allowance condition detection section
23 inhibitor switch
24 starting frictional element input·output revolution speed sensor
25 engine output system failure determination section
26 clutch hydraulic pressure control valve

What is claimed is:

1. An engagement pressure control apparatus for a starting frictional element at a time of an idle stop control of a vehicle, comprising:
    an engine;
    drive wheels;
    a transmission configured to transmit a power of the engine to the drive wheels via the starting frictional element under a gear shift;
    a gear shift control section configured to perform a gear shift control for the transmission by means of a hydraulic pressure from an engine driven oil pump driven by the engine, during a driving of the engine; and
    an idle stop control section configured to, when a predetermined condition is established, perform an idle stop such that the engine is automatically stopped and make the starting frictional element an engagement start immediate before state according to the engagement pressure produced by a partial draining of a working oil from an electrically-powered oil pump by means of a starting frictional element engagement pressure control section and to, when the predetermined condition becomes un-established, restart the engine in response to a release of the idle stop and make the engine a driving operation responding state, at a time of a vehicle stop determination, wherein, during an operation of the idle stop control section, a drain port opening angle of a clutch hydraulic pressure control valve for an engagement pressure command value issued to the starting frictional element engagement pressure control section is made small as compared with the drain port opening angle of an ordinary control in accordance with an input torque of the starting frictional element.

2. The engagement pressure control apparatus for the starting frictional element at the time of the idle stop control of the vehicle as set forth in claim 1, wherein the electrically-powered oil pump is configured to set the engagement pressure command value issued to the starting frictional element engagement pressure control section to a control maximum value.

3. The engagement pressure control apparatus for the starting frictional element at the time of the idle stop control of the vehicle as set forth in claim 2, wherein the electrically-powered oil pump has a pump capacity enough to drain the working oil by a quantity such that the starting frictional element is made in an engagement start immediate before state when the engagement pressure command value issued to the starting frictional element engagement pressure control section is set to the control maximum value.

4. The engagement pressure control apparatus for the starting frictional element at the time of the idle stop control of the vehicle as set forth in claim 2, wherein, during a failure under which it is impossible for the electrically-powered oil pump to generate a regular hydraulic pressure, the engagement pressure command value issued to the starting frictional element engagement pressure control section is an intermediate shelf pressure equivalent value in place of the control maximum value.

5. The engagement pressure control apparatus for the starting frictional element at the time of the idle stop control of the vehicle as set forth in claim 1, wherein, when an output control system of the engine has failed, the engagement pressure command value issued to the starting frictional element engagement pressure control section is set to an intermediate shelf pressure equivalent value in place of a control maximum value.

6. The engagement pressure control apparatus for the starting frictional element at the time of the idle stop control of the vehicle as set forth in claim 1, wherein, when a selection range of the transmission is switched during a time duration from a time at which the engine is restarted in response to the release of the idle stop to a time at which an idle stop release time control is started, the command value of the engagement pressure issued to the starting frictional element engagement pressure control section is set to an intermediate shelf pressure equivalent value in place of the control maximum value.

7. The engagement pressure control apparatus for the starting frictional element at the time of the idle stop control of the vehicle as set forth in claim 4, wherein the intermediate shelf pressure equivalent value is a return spring equivalent pressure required for the starting frictional element to be in the engagement start immediate before state against a built-in return spring.

\* \* \* \* \*